United States Patent
Romy

[11] 3,908,625
[45] Sept. 30, 1975

[54] SPARK PLUG WITH BUILT-IN PRECOMBUSTION CHAMBER

[76] Inventor: Stephen Romy, 71-23 Manse St., Forest Hills, N.Y. 11375

[22] Filed: Feb. 25, 1974

[21] Appl. No.: 445,616

[52] U.S. Cl. ........ 123/32 SP; 123/32 SJ; 123/169 R
[51] Int. Cl.² ............................................. F02P 1/00
[58] Field of Search .......... 123/32SPJ, 32 SJ, 169 R

[56] References Cited
UNITED STATES PATENTS

| | | | |
|---|---|---|---|
| 1,223,124 | 4/1917 | Thompson | 123/32 SJ |
| 2,008,803 | 7/1935 | Stephan | 123/32 SPJ |
| 2,331,912 | 10/1943 | Holthouse | 123/32 SPJ |
| 2,391,220 | 12/1945 | Beeh | 123/32 SPJ |
| 2,436,090 | 2/1948 | Bodine | 123/32 SPJ |
| 3,406,667 | 10/1968 | Evans | 123/32 SPJ |
| 3,434,461 | 3/1969 | Beesch | 123/32 SPJ |
| 3,665,902 | 5/1972 | Bloomfield | 123/32 SPJ |

FOREIGN PATENTS OR APPLICATIONS

| | | | |
|---|---|---|---|
| 637,584 | 5/1950 | United Kingdom | 123/32 SPJ |

*Primary Examiner*—Charles J. Myhre
*Assistant Examiner*—Daniel J. O'Connor
*Attorney, Agent, or Firm*—Flynn & Frishauf

[57] ABSTRACT

A spark plug has a precombustion chamber therein and a fuel line leading to the precombustion chamber. When the spark plug is installed and operated in an internal combustion engine, a stratified charge of fuel results within the engine combustion space, thereby leading to more efficient combustion of the fuel.

27 Claims, 4 Drawing Figures

SPARK PLUG WITH BUILT-IN PRECOMBUSTION CHAMBER

The present invention relates to spark plugs, and more particularly to a spark plug with a built-in precombustion chamber and fuel line.

Recently, new developments have been made in internal combustion engines in order to improve performance while meeting stringent anti-pollution standards. To meet the anti-pollution standards, catalytic converters and complicated stratified charge engines have been developed. The catalytic converter depends on running the engine with a rich fuel-air mixture and requires some amount of exhaust gas recirculation in order to control pollution. These measures, however, work against fuel economy. Still further, lead in the fuel coats the catalyst and sharply reduces its performance. In addition to wasting fuel, the disintegrating catalysts have been known to be toxic, thus introducing new problems besides excessive fuel consumption.

With stratified charge engines, the pollution problem is solved in a more economical manner with respect to fuel consumption. However, a serious drawback of the presently known stratified charge engine design is that it requires major modifications on the cylinder head, such as the forming of a precombustion chamber and gas passage; and forming and operating a third valve to supply fuel having a rich fuel-air mixture for the precombustion chamber. Such known engines also require two carburetors to supply the fuel-rich fuel-air mixture for the precombustion chamber and the lean fuel-air mixture for the normal engine combustion chamber. Alternatively, such engines require a specially built carburetor which simultaneously supplies both mixtures. With either type of above-described carburetor system, separate manifolds are needed, one for the normal combustion chamber and one for the precombustion chamber. Additionally, most passenger car V-8 engines use push rods operated from the camshaft in the engine block, which is an engine type that is less suitable for conversion to the stratified charge multivalve design. Rotary engines such as the Wankel engine, for example, cannot be modified in a conventional manner for stratified charge operation at the present time.

Therefore, the object of the present invention is to alter the conventional and rotary engine internal combustion process to a stratified charge combustion process by providing a spark plug with a built-in precombustion chamber and fuel line. In accordance with the object of the invention, the alteration to stratified charge operation is achieved without any modification on the design of the basic engine.

A further object of the present invention is to enable conversion to stratified charge of any type of internal combustion engine, including rotary engines, to provide the desired advantages of less pollution without sacrificing fuel economy. With the design of the present invention, only minor external modifications to the engine are necessary, as will be apparent from the following detailed description.

SUMMARY OF THE INVENTION

In accordance with the present invention, a spark plug comprises an electrical conducting shell which is adapted to be coupled to an engine cylinder and a precombustion chamber formed within the shell, the shell having an outlet leading from the precombustion chamber into the engine combustion space to which it is adapted to be coupled. Electrode means in provided in the precombustion chamber for igniting a fuel mixture therein and means is provided for feeding fuel into the precombustion chamber for ignition by the electrode means.

DETAILED DESCRIPTION OF ILLUSTRATED EMBODIMENTS

Figure 1:
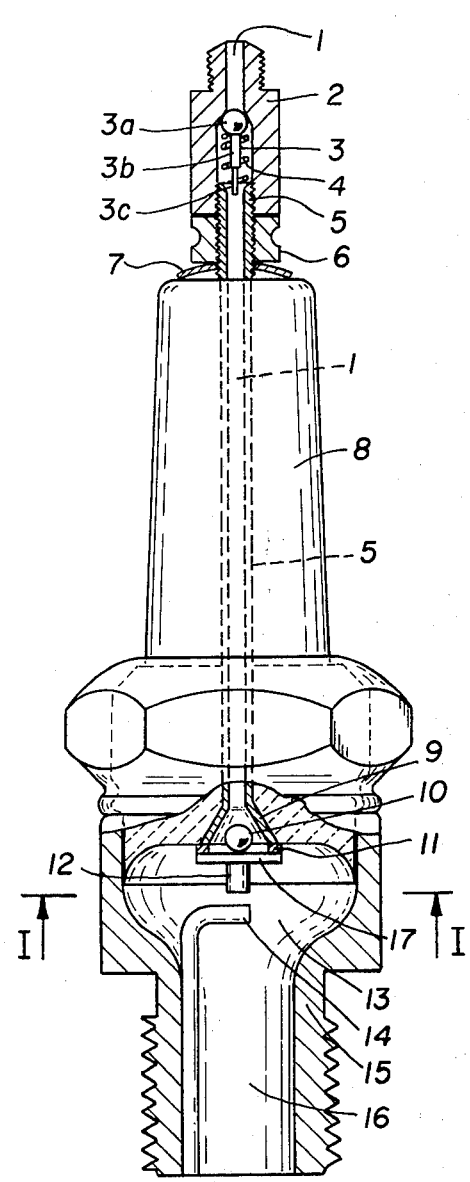
FIG. 1 is a view, partly in section, of a spark plug fabricated according to the present invention.
Figure 2:
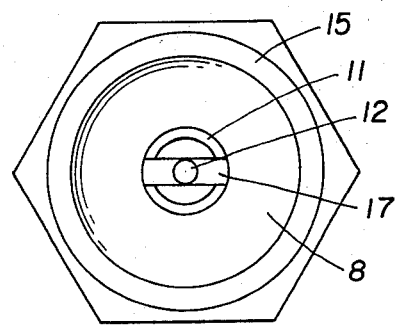
FIG. 2 is a cross-sectional view of the embodiment of FIG. 1 taken along the lines I—I.

Referring to FIGS. 1 and 2, there is shown a spark plug with a built-in precombustion chamber and fuel line according to the present invention. The base portion or shell 15 of the spark plug is of conventional exterior design and has a tubular insulator 8 attached to the upper end thereof. The lower portion of the shell 15 is threaded, as is a conventional spark plug. A precombustion chamber 13 is formed within the shell 15 and insulator 8 of the spark plug and fuel is delivered to the precombustion chamber 13 from the fuel supply through a nonconductive fuel line (not shown) to the fuel line 1 of the spark plug, through the check and feed valve arrangements 2, 3, 4, 5, 9 and 10 and through the fuel orifice discharge 11. The center electrode 12 is of electrically conductive material, as is conventional, and is connected to a tubular member 5 which functions to electrically connect the central electrode 12 with the spark plug terminal 6 via a connecting member 17. Tubular member 5 also serves as a portion of the fuel line 1 which passes through the spark plug and to the precombustion chamber 13, and the upper portion thereof cooperates with valve members 3b and 3c to provide a variable fuel flow valve. Member 2 is threaded onto the upper portion of the tubular member 5 and is easily removed to service the valve member 3, if necessary and makes assembly of the valve of the spark plug a simple matter.

The spark plug also includes an electrode 14 spaced from the central electrode 12 and connected to shell 15, the gap between electrodes 12 and 14 being located in the precombustion chamber 13. Electrode 14 is preferably spot welded to the shell 15.

The high voltage wire to the spark plug is connected at connector 6 which is electrically connected to tubular member 5, which is in turn electrically connected to the central electrode 12 of the spark plug. Connector 6 is internally threaded and screws onto the external threads of tubular member 5.

Member 7, preferably generally disk-shaped, is provided at the upper end of insulator 8 and compensates for differential expansion and contraction characteristics of the insulator 8 and the metallic tubular member 5.

The spark plug of the present invention operates in a conventional internal combustion engine, in general as set forth below.

On the engine intake stroke, vacuum develops. The free falling check valve member 10 falls to its lowermost position out of engagement with its seat 9, thereby opening the lower check valve. The vacuum in the engine causes check and feed valve member 3 to move downwardly against the bias of the spring 4, thereby withdrawing the ball portion 3a thereof from the valve seat formed at the upper portion of member 2. The opening of the valve members 3 and 10 admits fuel to the precombustion chamber 13 through fuel line 1, where it is vaporized. Simultaneously, the lean in fuel air-fuel mixture from the carburetor enters into the cylinder of the engine through the normal engine intake valve. The check and feed valve 2–4 closes whenever there is insufficient vacuum to overcome the pressure of the spring 4 on the valve member 3. The check valve member 10 is free falling and is closed during engine compression, expansion and exhaust strokes.

When the ignition is turned off, regardless of which part of the operating cycle the engine is in, the check and feed valve member 3 will close against the seat member 2 as soon as the pressure inside the cylinder is above a predetermined pressure which overcomes the spring 4 pressure. When the inside of the cylinder reaches atmospheric pressure, the valve member 3 is always closed by virtue of the upward bias of the spring 4.

Part of the fuel vapor fed into the precombustion chamber 13 during the intake stroke passes through the spark plug passage 16 into the normal engine combustion chamber and mixes with the lean in fuel air-fuel mixture, thereby enriching the mixture in the engine cylinder in the vicinity of the spark plug and forming a medium air-fuel mixture in the vicinity of the spark plug.

On the engine compression stroke, the check and feed valves close the fuel line 1 in the spark plug. From the engine combustion chamber, through the spark plug passage 16, part of the medium air-fuel mixture enters into the precombustion chamber 13 by compression and there, with the fuel vapor fed in through fuel line 1, forms a rich in fuel air-fuel mixture.

On ignition the rich in fuel air-fuel mixture ignites initially within the precombustion chamber 13, and the combustion spreads through spark plug passage 16 into the engine combustion chamber to complete the combustion operation.

A summary of the air-fuel mixture stratification, just before ignition and combustion is as follows:

1. Rich in fuel air-fuel mixture exists in the spark plug precombustion chamber 13;
2. Medium air-fuel mixture exists in the spark plug passage 16 and around the gas passage port inside the normal engine combustion chamber; and
3. Lean in fuel air-fuel mixture exists in the rest of the engine combustion chamber.

With the above stratification of the fuel-air mixture, excellent combustion characteristics with fewer air pollutants is obtained in a simple and expedient manner. Substantially any engine can be easily converted to use with the spark plug of the present invention to effectively provide such a stratified charge internal combustion engine.

As illustrated in FIG. 1, the check and feed valve member 3 has an upper ball portion 3a which selectively seats against a valve seat formed at the upper portion of member 2 to effectively close off the fuel flow into the precombustion chamber 13. The valve member 3 further includes lower portions 3b and 3c of progressively decreasing diameter. Portions 3b and 3c cooperate with the upper portion of tubular member 5 to provide openings of varying sizes, depending upon which portion 3b or 3c is lowered into registration with the upper portion of tubular member 5. When the intake (or throttle) is closed or nearly closed, such as when the engine is operating at low speed, cylinder vacuum is high. Thus, atmospheric pressure pushes the check ball 3a and metering rod 3b and 3c down to its lowermost position, against the bias of spring 4, to restrict fuel flow in the fuel line 1. This is easily seen since the larger portion 3b is in registration with the upper portion of tubular member 5 when the valve member 3 is in its lowermost position. When the air intake is opened, for example by means of the throttle, the cylinder vacuum is decreased and the spring pressure provided by spring 4 raises the metering rod 3b, 3c and check ball 3a, permitting an increased fuel flow through fuel line 1 to supply the demand for full power. This is accomplished because the small diameter portion 3c of the metering rod is in registration with the upper portion of the tubular member 5 during such high air intake conditions. This metering system, in conjunction with the precombustion chamber 13, further enhances the operation of the spark plug of the present invention.

The above described metering valve member 3 forms a very sensitive vacuum operated check ball and metering system which, in many installations, eliminates the need for the uneconomical polluting accelerating system in the conventional carburetor.

Figure 3:
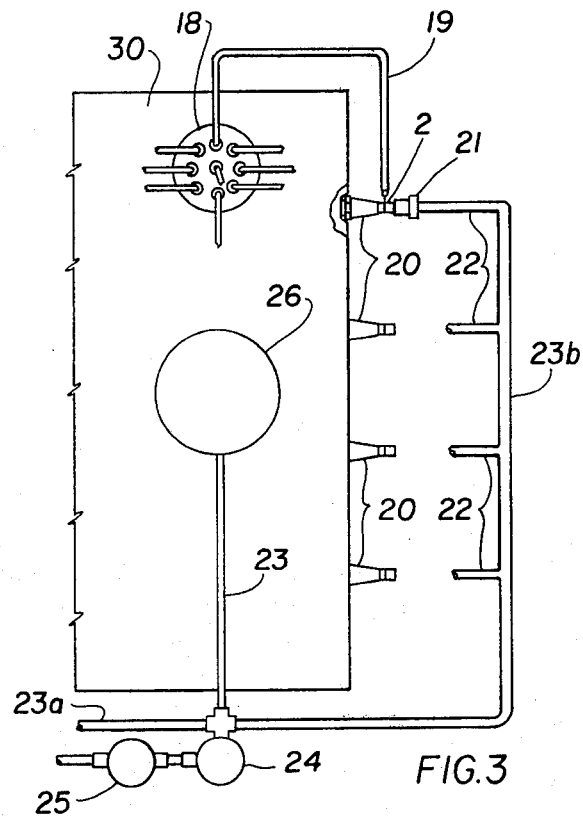
FIG. 3 is a schematic illustration of implementation of the spark plug of the present invention with a conventional V-8 internal combustion engine only a portion of the engine being shown.

FIG. 3 illustrates the use of the spark plug of the present invention in a conventional V-8 internal combustion engine, only one-half of which is shown. The invention is clearly useful in various other types of engines. The engine 30 includes a conventional distributor 18, conventional spark plug leads 19 (only one of which is shown), the spark plug leads 19 being connected to respective electrical connectors 6 (FIG. 1) of the spark plugs. The spark plugs 20 are each spark plugs of the present invention, such as illustrated in FIGS. 1 and 2 and replace conventional spark plugs. A conventional fuel pump 25 is connected to the fuel tank in the normal manner and the output thereof is connected to a fuel pressure regulator 24, the output of which is fed to a fuel supply line 23 which in turn feeds fuel to the carburetor 26, which may be of conventional design, or without choke mechanism. The system of the present invention can supply a rich fuel air mixture to start a cold engine without the uneconomical, polluting choke valve, because the rich in fuel, fuel-air mixture is every time present for easy ignition in the precombustion chamber. Therefore, the conventional choke may be advantageously eliminated.

The output of the pressure regulator also supplies fuel via fuel lines 23a and 23b to electrically nonconductive fuel lines 22 which in turn are connected to respective spark plugs 20 via respective fuel line connectors 21. The fuel line connectors 21 connect to the spark plugs, for example at the threaded upper end of member 2 (FIG. 1) by means of a threaded coupling.

The pressure regulator is desired so that excessively pressurized fuel is not supplied to the fuel lines. The engine, connected as shown in FIG. 3, operates as discussed above with respect to the description of the operation of the spark plug of FIGS. 1 and 2.

While FIG. 3 is directed to conventional reciprocating piston type engines, the spark plug of the present invention is in particular suitable for use with a rotary type engine such as the Wankel engine. The required modifications to the rotary engine are similar to those discussed above with respect to conventional engines and a detailed description is not given herein.

Figure 4:
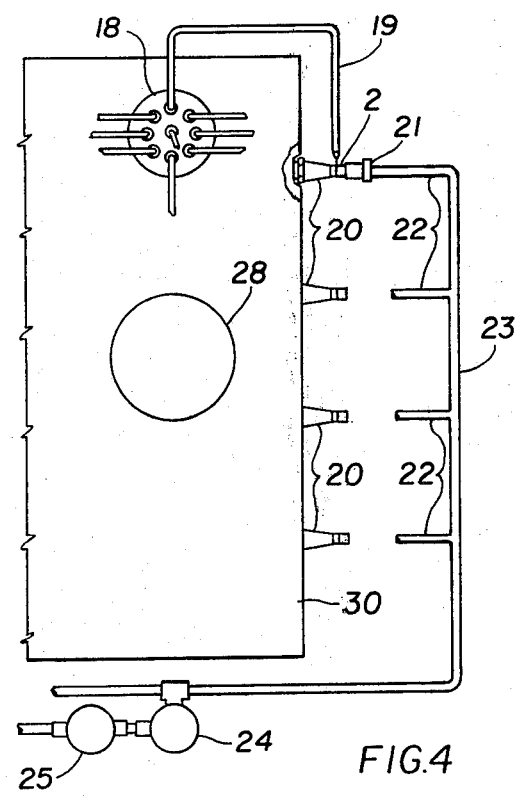
FIG. 4 is a schematic illustration of another implementation of the spark plug of the present invention in an engine.

As illustrated in FIG. 4, the spark plug of the present invention can also be used in a manner such that all of the fuel for the engine cylinders is fed through the spark plug fuel line, and air only is fed through the normal engine intake manifold. In this connection, the conventional carburetor 26 is replaced by an air intake means 28, which may comprise a metered air flow device. Such an air flow device may be mechanically operated, and, for example, may comprise a throttle controlled valve. The fuel tank is coupled to a conventional fuel pump 25, the output of which is fed to a fuel pressure regulator 24 and then to fuel lines 23 which connect to non-conductive fuel lines 22 which in turn are coupled to the spark plugs of the present invention as described above with respect to FIG. 3.

While the present invention has been described above with respect to specific embodiments, it should be clear that various alterations and modifications can be made by those ordinarily skilled in the art within the scope and spirit of the invention as defined in the appended claims.

I claim:

1. A spark plug comprising:
   an electrically conductive shell member (15);
   a precombustion chamber (13) formed within said shell member (15), said shell member having a gas passage (16) leading out from said precombustion chamber (13);
   an elongated electrically insulating sleeve (8) extending in a direction away from said gas passage (16) and precombustion chamber (13);
   electrode means (12,14) at least partially located within said precombustion chamber (13);
   means for feeding fuel into said precombustion chamber (13) for ignition by said electrode means, said fuel feeding means including means (5) defining an elongated fuel passage passing substantially axially through said elongated insulating sleeve (8) and terminating at said precombustion chamber (13); and means (2) for feeding fuel to the end of said fuel passage defining means (5) remote from said precombustion chamber (13); and
   metering means at the end portion of said fuel passage defining means (5) which is remote from said precombustion chamber (13) for adjustably metering the feeding of fuel to said precombustion chamber (13), said metering means including a variable diameter rod means (3) selectively communicating with the interior of the defined fuel passage, said rod means (3) being movably mounted relative to said fuel passage defining means (5) for movement in the axial direction of said fuel passage, said rod means having at least two portions (3b,3c) of different diameters and being movable responsive to vacuum in said precombustion chamber (13) for selectively communicating said different diameter portions with said fuel passage defining means (5) for varying the size of the fuel feeding passage in the vicinity of said rod means between a minimum fuel flow position at which a predetermined minimum amount of fuel is permitted to flow through said fuel passage and a maximum fuel flow position at which a predetermined maximum amount of fuel is permitted to flow through said fuel passage, and biasing means (4) biasing said rod means (3) relative to said fuel passage defining means (5) such that said metering means is in said maximum fuel flow position under low vacuum conditions in said precombustion chamber and is in said minimum fuel flow position under high vacuum conditions in said precombustion chamber.

2. A spark plug according to claim 1 wherein said electrode means includes two electrodes (12,14), at least one (14) of which is coupled to said electrically conductive shell (15).

3. A spark plug according to claim 2 wherein said insulating sleeve (8) carries the other (12) of said electrodes.

4. A spark plug according to claim 3 wherein said means for feeding fuel to said precombustion chamber includes valve means at the remote end of said tubular member (5) for selectively blocking the supply of fuel to said precombustion chamber (13).

5. A spark plug according to claim 4 wherein said valve means is located to selectively block the supply of fuel to said tubular member (5).

6. A spark plug according to claim 4 wherein said valve means is coupled to said metering means and blocks the supply of fuel when vacuum in said precombustion chamber falls below a predetermined value.

7. A spark plug according to claim 6 wherein said valve means includes a seat member in said fuel passage upstream of said metering means; and a valve member (3a) located in the fuel passage and biased under the influence of said metering means biasing means (4) toward said seat member.

8. A spark plug according to claim 7 wherein said valve member (3a) is connected to an end of said rod means.

9. A spark plug according to claim 8 wherein said rod means includes a first portion (3c) having a first diameter and a second portion (3b) having a second diameter larger than said first diameter, said first and second rod portions being connected end-to-end in axial alignment with each other and with said fuel passage, said first rod portion (3c) being oriented closer to said precombustion chamber (13) than said second rod portion and communicating with said fuel passage during increase of said vacuum before said second rod portion, and said valve member (3a) is connected to the free end of said second rod portion (3b).

10. A spark plug according to claim 9 wherein said first and second portions (3c,3b) and said valve member (3a) are integrally formed as a one-piece member (3).

11. A spark plug according to claim 1 wherein said insulating sleeve (8) defines a portion of said precombustion chamber (13).

12. A spark plug according to claim 1 wherein said fuel passage defining means includes an electrically conducting tubular member (5) passing through and carried by said elongated insulating sleeve (8).

13. A spark plug according to claim 12 wherein said electrode means includes two electrodes (12,14), one electrode (14) being connected to said shell (15); and the other electrode (12) being electrically connected to said tubular member (5).

14. A spark plug according to claim 12 further comprising a further check valve (9,10) at the end of said tubular member 5 closest to said precombustion chamber (13) for preventing back flow of the fuel-air mixture and combustion gas into the fuel passage, said check valve including means (10) in the fuel flow path for at least partially atomizing fuel at least just prior to its entry into said precombustion chamber (13).

15. A spark plug according to claim 12 including thermal expansion compensation means (7) coupled to said tubular member (5) and to said electrically insulating sleeve (8) for compensation of differential longitudinal expension and contraction between said tubular member (5) and said insulating sleeve (8).

16. A spark plug according to claim 13 comprising means (5,6) for coupling high voltage to said other electrode (12), said high voltage coupling means including said elecrically conducting tubular member (5).

17. A spark plug according to claim 13 wherein said tubular member (5) has an opening substantially in the center of the upper wall of said precombustion chamber, which upper wall is remote from said gas passage (16), and comprising an electrically conductive cross-member (17) connected to a portion of said tubular member defining said opening and spanning a portion of said opening, said other electrode (12) being coupled to and carried by said electrically conductive and cross-member (17).

18. A spark plug according to claim 17 wherein said opening is substantially round and said electrically conductive cross-member (17) comprises a generally bar-shaped member spanning said opening substantially along a diameter thereof.

19. A spark plug according to claim 1 wherein said rod means includes a first portion (3c) having a first diameter and a second portion (3b) having a second diameter larger than said first diameter said first and second rod portions being connected end-to-end in axial alignment with each other and with said fuel passage, said first rod portion (3c) being oriented closer to said precombustion chamber (13) than said second rod portion and communicating with said fuel passage during increase of said vacuum before said second rod portion.

20. A spark plug according to claim 1 wherein said gas passage (16) is substantially larger than said fuel feeding passage defined by said fuel feeding means (5).

21. A spark plug according to claim 20 wherein said fuel feeding passage has a substantially circular cross-section, and wherein said gas passage (16) has a substantially circular cross-section, the diameter of said gas passage (16) being substantially larger than the diameter of said fuel feeding passage.

22. A spark plug according to claim 1 wherein said electrode means (12,14) defines a spark gap substantially centrally of said precombustion chamber (13).

23. A spark plug comprising:
an electrically conducting shell member (15);
an electrically insulating sleeve (8) coupled with said shell member (15);
a precombustion chamber (13) formed within said electrically conducting shell member (15);
a first electrode (14) connected to said shell member (15);
an electrically conducting tubular member (5) extending substantially axially through said electrically insulating sleeve (8) and having a lower end terminating at said precombustion chamber (13);
a second electrode (12) coupled to said lower end of said electrically conducting tubular member (5) and spaced from said first conductor (14) to form a gap therebetween, said gap being inside said precombustion chamber (13);
means (6) for coupling high voltage to said electrically conducting tubular member (5);
means (2,3) coupled to said electrically conducting tubular member (5) for feeding fuel through said electrically conducting tubular member (5);
a gas passage (16) leading from said precombustion chamber (13) through said electrically conducting shell member (15); and
metering means at the end portion of said electrically conducting tubular member (5) which is remote from said precombustion chamber (13) for adjustably metering the feeding of fuel to said precombustion chamber (13), said metering means including a variable diameter rod means (3) selectively communicating with the interior of said tubular member (5), said rod means (3) being movably mounted relative to said tubular member (5) for movement in the axial direction thereof, said rod means (3) having at least two portions (3b,3c) of different diameters and being movable responsive to vacuum in said precombustion chamber (13) for selectively communicating said different diameter portions with the interior of said tubular member (5) for varying the size of the fuel feeding passage therethrough between a minimum fuel flow position at which a predetermined minimum amount of fuel is permitted to flow through said fuel passage and a maximum fuel flow position at which a predetermined maximum amount of fuel is permitted to flow through said fuel passage, and biasing means (4) biasing said rod means (3) relative to said tubular member (5) such that said metering means is in said maximum fuel flow position under low vacuum conditions in said precombustion chamber and is in said minimum fuel flow position under high vacuum conditions in said precombustion chamber.

24. A stratified charge internal combustion engine having a plurality of combustion chambers, comprising:
a plurality of spark plugs of the same number as the number of combustion chambers and coupled to said engine in communication with a respective combustion chamber, each of said spark plugs including:
an electrically conductive shell member (15);
a precombustion chamber (13) formed within said shell member (15), said shell member having an outlet (16) leading out from said precombustion chamber (13);
an elongated electrically insulating sleeve (8) extending in a direction away from said gas passage (16) and precombustion chamber (13);
electrode means (12,14) at least partially located within said precombustion chamber (13);

means for feeding fuel into said precombustion chamber (13) for ignition by said electrode means (12,14), said fuel feeding means including means (5) defining an elongated fuel passage passing substantially axially through said elongated insulating sleeve (8) and terminating at said precombustion chamber (13); and means (2) for feeding fuel to the end of said fuel passage defining means (5) remote from said precombustion chamber (13); and metering means at the end portion of said fuel passage defining means (5) which is remote from said precombustion chamber (13) for adjustably metering the feeding of fuel to said precombustion chamber (13), said metering means including a variable diameter rode means (3) selectively communicating with the interior of the defined fuel passage, said rod means (3) being movably mounted relative to said fuel passage defining means (5) for movement in the axial direction of said fuel passage, said rod means having at least two portions (3b,3c) of different diameters and being movable responsive to vacuum in said precombustion chamber (13) for selectively communicating said different diameter portions with said fuel passage defining means (5) for varying the size of the fuel feeding passage in the vicinity of said rod means between a minimum fuel flow position at which a predetermined minimum amount of fuel is permitted to flow through said fuel passage and a maximum fuel flow position at which a predetermined maximum amount of fuel is permitted to flow through said fuel passage, and biasing means (4) biasing said rod means (3) relative to said fuel passage defining means (5) such that said metering means is in said maximum fuel flow position under low vacuum conditions in said precombustion chamber and is in said minimum fuel flow position under high vacuum conditions in said precombustion chamber;

said stratified charge internal combustion engine further comprising:

high voltage distribution means (18,19) coupled to said spark plugs for selectively causing said electrode means to ignite said fuel-air mixture in said precombustion chamber in timed relationship to the operation of said engine; and fuel supply means (24,25) for supplying fuel at least to said fuel feeding means of each of said spark plugs.

25. An engine according to claim 24 wherein said fuel supply means includes a pressure regulator (24) for feeding fuel to said spark plugs at a regulated pressure.

26. An engine according to claim 24 wherein said fuel supply means further comprises a carburetor (26) for supplying a fuel-air mixture to said combustion chambers.

27. An engine according to claim 24 including air supply means (28) for supplying only air to each of said engine combustion chambers, the fuel being supplied only to said spark plugs.

* * * * *